United States Patent [19]
Alperovich et al.

[11] Patent Number: 5,960,356
[45] Date of Patent: Sep. 28, 1999

[54] PAGING A MOBILE STATION WITHIN A PUBLIC LAND MOBILE NETWORK (PLMN)

[75] Inventors: Vladimir Alperovich, Dallas; Alain Maupin, Richardson, both of Tex.

[73] Assignee: Ericsson, Inc., Research Triangle Park, N.C.

[21] Appl. No.: 08/761,597

[22] Filed: Dec. 6, 1996

[51] Int. Cl.[6] ...................................................... H04Q 7/00
[52] U.S. Cl. ........................... 455/458; 455/440; 455/432
[58] Field of Search .................................... 455/422, 426, 455/432, 435, 440, 436, 456, 458, 517, 446, 443, 444

[56] References Cited

U.S. PATENT DOCUMENTS

| | | | |
|---|---|---|---|
| 5,153,902 | 10/1992 | Buhl et al. ................................ | 455/432 |
| 5,357,561 | 10/1994 | Grube ....................................... | 455/458 |
| 5,369,681 | 11/1994 | Boudreau et al. ....................... | 455/456 |
| 5,432,841 | 7/1995 | Rimer ...................................... | 455/432 |
| 5,444,765 | 8/1995 | Marui et al. ............................. | 455/432 |
| 5,521,961 | 5/1996 | Fletcher et al. ......................... | 455/444 |

*Primary Examiner*—Nguyen Vo
*Assistant Examiner*—Marsha D. Banks-Harold
*Attorney, Agent, or Firm*—Jenkens & Gilchrist, P.C.

[57] ABSTRACT

A first location update is performed whenever a mobile station enter a particular location area. Thereafter, in the even that the mobile station enters a designated home zone within the location area, a second location update is again performed to inform the serving mobile switching center (MSC) that the mobile station is currently located within the designated home zone. All paging messages for subsequent incoming calls are then broadcasted only within the cell areas associated with the designated home zone.

17 Claims, 7 Drawing Sheets

PAGING A MOBILE STATION WITHIN A PUBLIC LAND MOBILE NETWORK (PLMN)

BACKGROUND OF THE INVENTION

1. Technical Field of the Invention

The present invention relates to a telecommunications network and, in particular, to the provision of a paging message broadcast towards a mobile station within a Public Land Mobile Network (PLMN).

2. Description of Related Art

With the introduction of the Global System for Mobile (GSM) communication and the Personal Communications System (PCS), the concepts of wireline telephone service and wireless telephone service have changed drastically. Instead of assigning a telephone number to a particular geographic location, GSM or PCS teaches the assignment of a telephone number to a particular subscriber. As a result, each subscriber is associated with a Subscriber Identity Module (SIM) card. Using an SIM card, a mobile subscriber is able to store necessary mobile subscriber information in a detachable memory unit and thereafter freely associate the module with any available mobile station. Such information includes a mobile subscriber's Mobile Station Integrated Service Digital Network (MSISDN) number, and other user specified information, such as preferred speed dialing lists or screening lists. By inserting a mobile subscriber's SIM card into a mobile station, the stored subscriber information in the inserted SIM card is available to the mobile subscriber's new terminal. As a result, the mobile subscriber is able to freely utilize any available mobile station while maintaining the same MSISDN number and subscriber feature data.

Furthermore, in order to enable the mobile subscriber to utilize the associated mobile station as a cordless phone for charging purposes while traveling within a certain geographic location, the concept of a "home zone" has been introduced. If the mobile subscriber makes a call within his or her home zone, the mobile station functions as a conventional cordless phone and the mobile subscriber is not charged for the air time, or is charged at a significantly lower air time rate. Accordingly, within his or her home zone, the mobile subscriber can utilize his or her mobile station to originate outgoing calls without incurring expensive air time charges and without physically using a different telephone terminal, e.g., wireline terminal such as a cordless phone.

With a conventional cordless terminal, a radio frequency range between the serving base unit and the cordless terminal is rather limited. Consequently, a subscriber is not able to travel out of the immediate vicinity of the base unit and make outgoing calls. However, with a PCS or GSM based telecommunications network, even if the mobile subscriber is within the home zone, the telecommunications service is still being provided by the same mobile switching center (MSC) serving that particular geographic location. Therefore, within the conventional cordless system, it was the physical limitation that imposed the geographic boundaries of the service area. In contrast, within the GSM or PCS network, it is the logical limitation that imposes the geographic boundaries of the mobile subscriber's home zone. Accordingly, the home zone associated with a particular mobile subscriber can be much larger than what was previously available with the conventional cordless system. Such a home zone may include only a few locks from the subscriber's home or business, or a radius of half mile, for example, covering a certain location.

Home zones are designated because, statistically, mobile subscribers tend to spend a great amount of time in one fixed location. Accordingly, a favorable billing rate is provided as long as a particular mobile subscriber is located within his or her designated home one. Normally, such home zones designated by mobile subscribers are much smaller than the location areas (LA) associated with those home zones. As an illustration, a typical location area may include hundreds or even thousands of cell areas (CA), whereas a home zone might typically cover only a few cell areas within a location area.

Whenever an incoming call is received towards the mobile station located within the designated home zone, the serving MSC needs to page the called mobile station. Because the serving MSC has no means of determining which cell area is currently serving the called party mobile station until the mobile station responds to the page, the serving MSC must broadcast paging messages throughout the whole location area. Utilization of paging channels (PCH) associated with hundreds or even thousands of involved cell areas (CA) to page a single mobile station locate within a much smaller home zone is a rather inefficient and wasteful use of system resources.

Accordingly, there is a need for a mechanism to page a mobile station more efficiently and effectively when the mobile station is currently traveling within its designated home zone.

SUMMARY OF THE INVENTION

One or more cell areas within a particular location area is designated as a home zone for a particular mobile subscriber within a mobile telecommunications network. Whenever the mobile station enters the location area, a first location update is performed to inform the serving mobile switching center (MSC) that the mobile station is within the specified location area. Thereafter, in case the mobile station enters the home zone within that location area, yet another location update is performed to further inform the serving MSC that the mobile station is now within the home zone. Subsequently, all paging messages for incoming calls intended for that mobile stations are broadcast only within those cell areas associated with the designated home zone.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
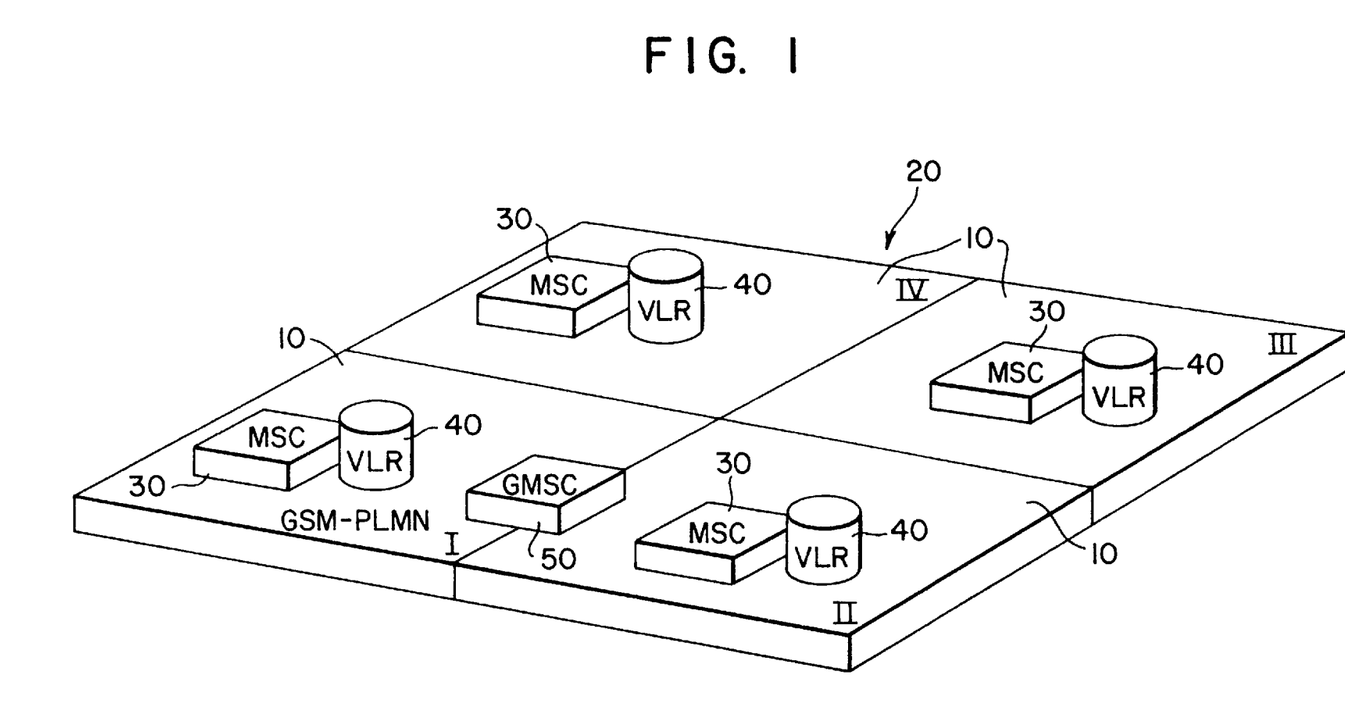
FIG. 1 is a block diagram of a telecommunications network illustrating multiple mobile switching centers (MSCs) within a Public Land Mobile Network (PLMN)

FIG. 1 is a block diagram of a telecommunications network illustrating multiple mobile switching center (MSC) areas 10 within a Public Land Mobile Network (PLMN) 20. A PLMN network 20 is a complex configuration comprising multiple MSCs 30, VLRs 40, HLRs (not shown in FIG. 1), GMSC 50, etc. In order to properly switch or route a call to a mobile station located within a particular PLMN 20, the correct entities and devices need to be invoked and involved in a call process. The individual PLMN 20 may contain parts of one or more single Local Access Transport Areas (LATA). There are over three hundred LATAs presently defined throughout the United States. As shown in FIG. 1, within each LATA, there are multiple MSC/VLR areas 10 each being served by an individual MSC/VLR (usually, an MSC 30 is co-located with a corresponding VLR 40, and hereinafter referenced collectively as an MSC/VLR).

Figure 2:
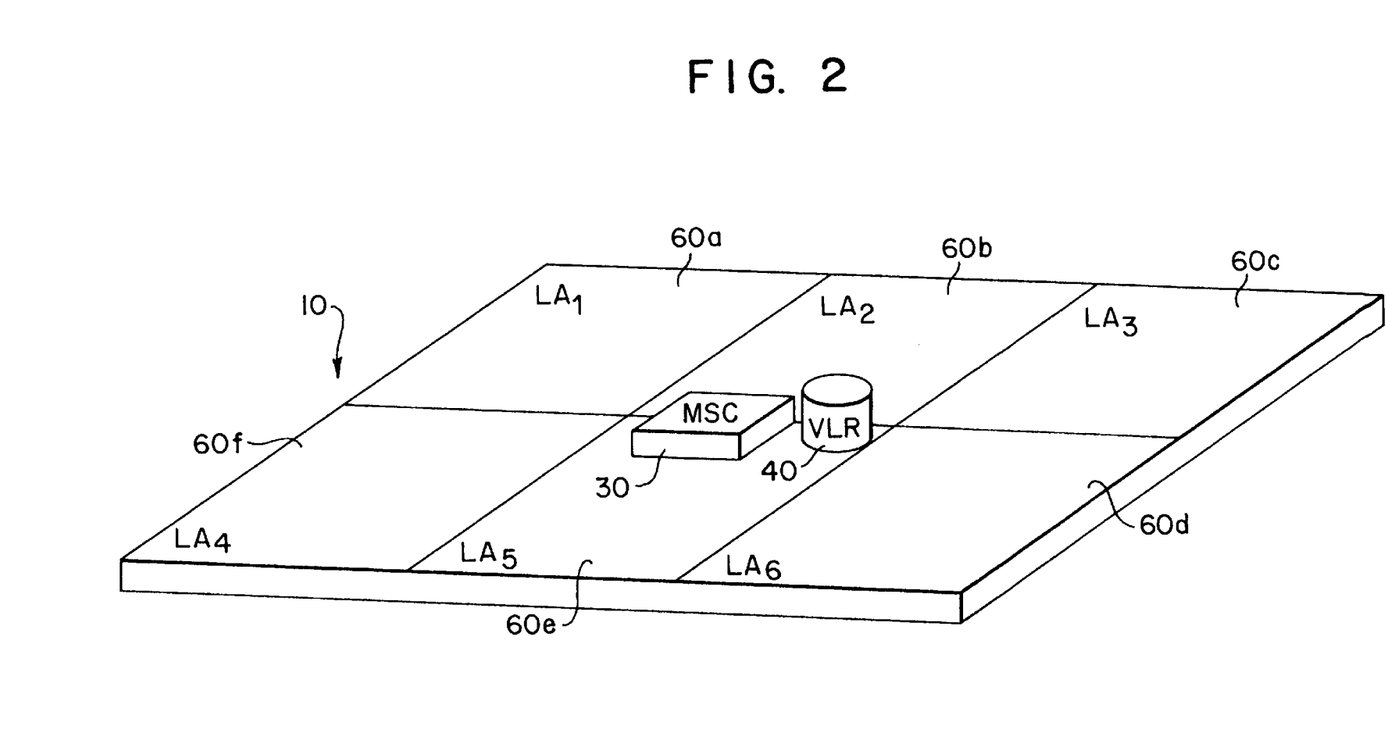
FIG. 2 is a block diagram illustrating a single MSC area further comprising multiple location areas (LAs)

Reference is now made to FIG. 2 illustrating multiple location areas 60a–60f within a particular MSC area 10. A location area (LA) is a part of the MSC service area in which a mobile station may move freely without updating location information to the MSC/VLR 30/40 serving that location area. Therefore, a location area (LA) is the area where a paging message is broadcast to find the called mobile station for an incoming call. A location area identity (LAI) which identifies each location area 60 is used by the mobile network to search for a mobile station in idle state.

Figure 3:
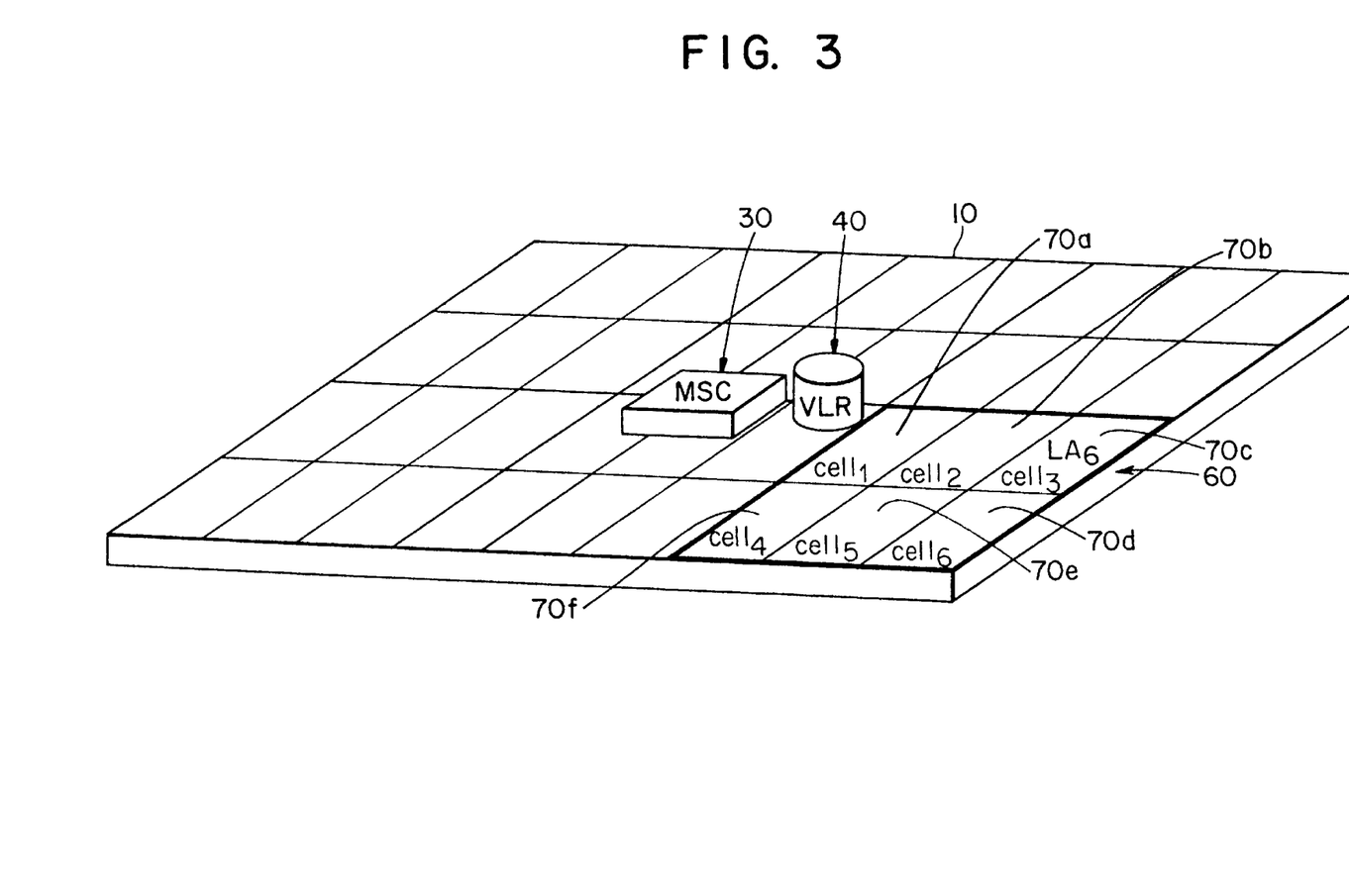
FIG. 3 is a block diagram illustrating a single location area (LA) further comprising multiple cell areas (CAs)

Further referring to FIG. 3, each location area 60 within a particular MSC coverage area 10 is further divided into multiple cell areas (CAs) 70a–70f. Each cell is served by a separate base transceiver station (BTS, not shown in FIG. 3). However, as described above, all cells within a single location area are served by the same MSC 30 and VLR 40. As a result, different cell areas (CAs) 70 within a single location area (LA) 60 are distinguished by the MSC/VLR and the serving base station system (BSS) using a Cell Identity (CI) assigned to each cell. Different cell areas (CAs) 70 using the same Broadcast Control Channel (BCCH) frequency are then distinguished by the mobile station using a Base Station Identity Code (BSIC).

Figure 4:
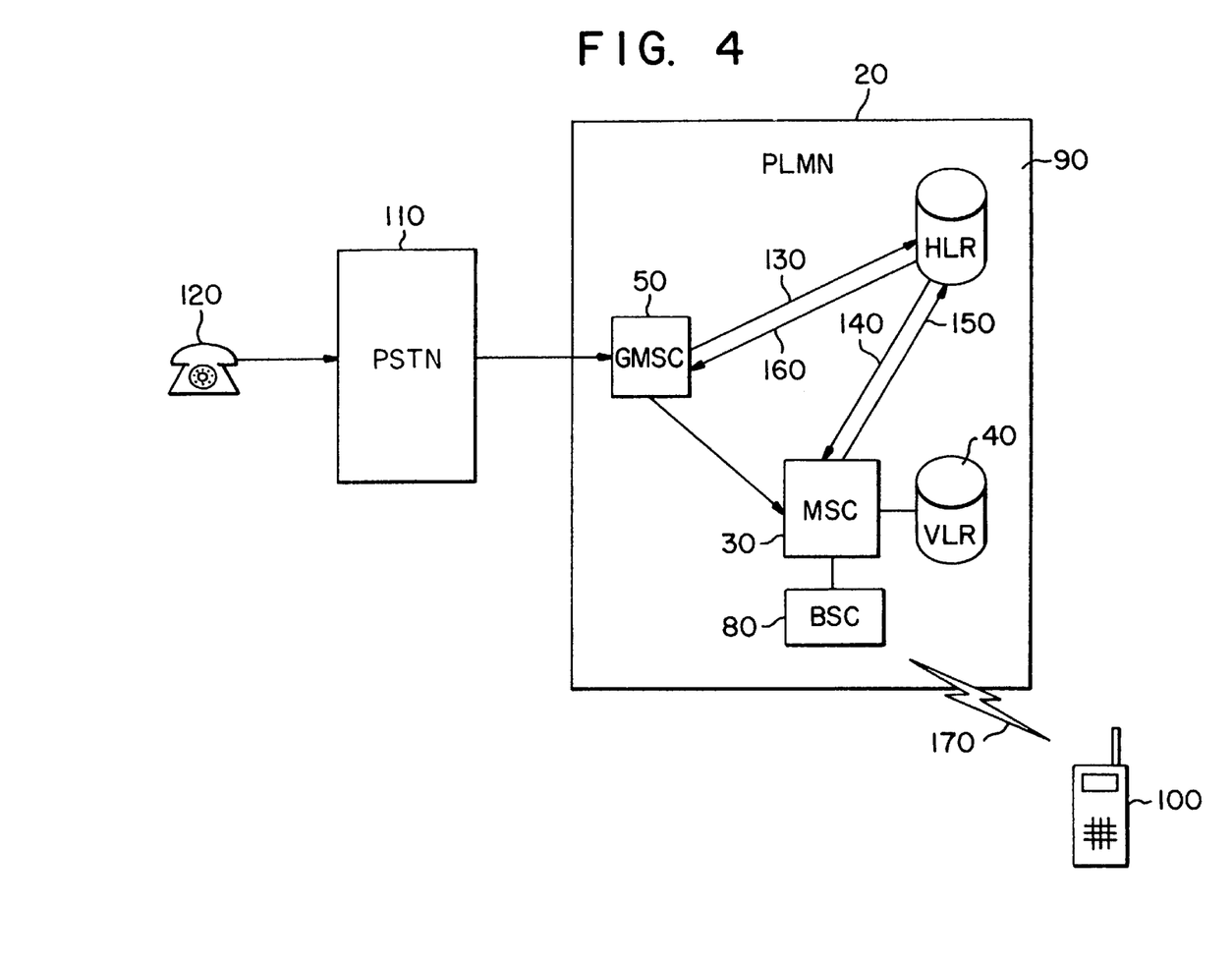
FIG. 4 is a block diagram of a telecommunications network including a Public Land Mobile Network (PLMN) for routing an incoming call to a mobile station.

Reference is now made to FIG. 4 illustrating the routing of an incoming call towards a mobile station 100 within a telecommunications network. Whenever the mobile station 100 travels into a particular mobile switching center (MSC) coverage area, a registration is made, and a visitor location register (VLR) 40 associated with the serving MSC 30 communicates with a home location register (HLR) 90 associated with the mobile station 100. Such communication informs the HLR 90 of the mobile station's current location. It further enables the VLR 40 to copy relevant subscriber information associated with that particular mobile subscriber from the HLR into its associated database. The serving MSC/VLR 30/40 is now able to provide mobile service, such as call connections, to the newly registering mobile station 100.

Whenever a telecommunications terminal, such as a wireline terminal 120 connected to a Public Switched Telephone Network (PSTN) 110, originates a call connection towards the mobile station 100, a call setup message is generated and routed to a gateway mobile switching center (GMSC) 50 associated with the mobile station 100. The GMSC 50, in turn, performs an HLR interrogation to determine the location of the mobile station 100 by transmitting a signal 130 to the HLR 90 requesting routing information. The HLR 90, which stores subscriber information and keeps track of the current location of the mobile station 100, then transmits a signal 140 requesting a roaming number to the MSC/VLR 30/40 currently serving the mobile station 100. In response, the serving MSC/VLR 30/40 identifies the called party mobile station 100 and returns the roaming number to the HLR 50 via another signal 150. The HLR 90, in turn, forwards the received roaming number representing the network address of the serving MSC 30 back to the requesting GMSC 50 with yet another signal 160. Utilizing the received roaming number, the GMSC 50 then reroutes the received call setup signal to the specified MSC 30. After querying the associated VLR 40 to determine the current location area (LA) covering the mobile station 100, the serving MSC 30 then pages the mobile station 100 within the determined location area. Upon receiving a response back from the paged mobile station, the serving MSC 30 identifies the particular cell currently serving the called party mobile station and establishes a call connection over an appropriate traffic channel 170 associated with that determined cell area.

Referring back to FIG. 3, although only six cell areas 170a–170f are shown within a single location area 160 for exemplary purposes, a typical location area usually comprises hundreds of individual cell areas. Since the VLR 30 only maintains data indicating which location area is currently serving the called party mobile station, each time an incoming call is received towards a particular mobile station, each and every one of the associated cell areas within a relevant location area needs to be paged. Since a mobile station is physically located within only one cell area in a given time, broadcasting paging messages over hundreds of cell areas is a rather inefficient and wasteful management of valuable channel resources.

On the other hand, in order to transmit a paging message only towards a particular cell area currently covering the called party mobile station, the serving MSC/VLR 30/40 needs to be updated and maintained with data identifying the current cell area. Consequently, the mobile station 20 needs to perform a location update or communicate with the associated MSC/VLR 40/30 each time the mobile station 20 travels out of a first cell area and into a second cell area. Since each cell area covers a relatively small geographic area, the frequency of such exits and entries could, as a result, cause an unmanageable and undesirable amount of resulting signaling overhead to be imposed on the associated telecommunications node.

With the introduction of the Global System for Mobile (GSM) communication and the Personal Communications System (PCS), the concept of a "home zone" (HZ) has been introduced. Statistically, it has been shown that a typical mobile subscriber tends to spend a large amount of time within a fixed location, such as his or her residence or business. In order to enable the mobile subscriber to utilize his or her mobile stations as a conventional cordless phone without switching to a different terminal or telecommunications network, such a frequently used fixed location associated with that particular mobile subscriber is designated as a "home zone". Accordingly, as long as the mobile subscriber is located within the designated home zone, the PLMN serving the mobile station does not charge for the air time, or is charged at a significantly lower air time rate. As a result, the mobile station is still being served by the same PLMN but charged at a reduced rate.

Figure 5:
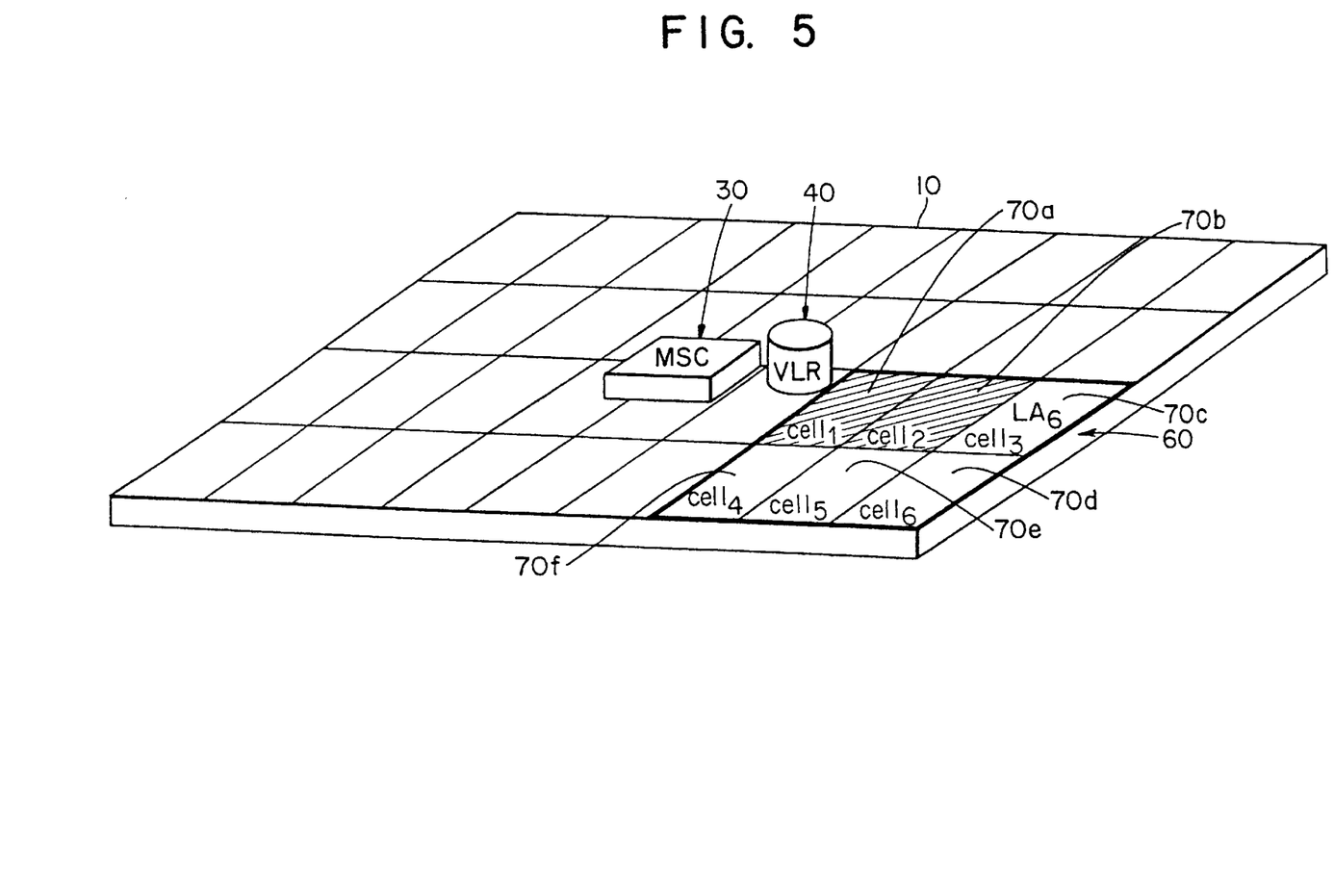
FIG. 5 is a block diagram of a PLMN illustrating a home zone for a particular mobile station within a location area.

Reference is now made to FIG. 5 illustrating a home zone within a particular location area. A selected geographic area is designated by a mobile subscriber as his or her "home zone". Accordingly, one or more cell areas, such as 70a–70b, are associated with the mobile subscriber as his or her home zone cell areas. Data identifying the home zone cell areas are then stored at the associated mobile station or at a Subscriber Identity Module (SIM) card associated with the mobile subscriber. Whenever the mobile subscriber travels into a particular cell area 70, the associated mobile station 100 receives a broadcast message transmitted over one of the broadcast channels identifying the current cell area. By comparing the received cell area data with its internally stored home zone data, the mobile station is able to ascertain whether the mobile subscriber is currently within his or her home zone. An indication informing the mobile subscriber's entry into the designated home zone is then displayed on the associated display unit. Thereafter, a call setup signal transmitted from the mobile station to the serving MSC includes an indication that the call is being originated within the designated home zone. As a result, the reduced rate is accordingly changed to the corresponding subscription for this particular call connection.

As described above, performing location update with a serving MSC/VLR each time a mobile station travels in and out of a particular cell area is impractical. On the other hand, paging a mobile station throughout the whole location area in a conventional manner is also rather inefficient and wasteful. However, statistically, it has been shown that the associated mobile subscriber spends a substantial amount of time within his or her designated home zone. By performing a location update whenever a particular mobile station enters and exists a designated home zone instead of each and every cell area, the number and frequency of such location updates becomes manageable. By informing the serving MSC/VLR 30/40 that the mobile station is located within its designated home zone, paging of the mobile station for an incoming call can be limited to the designated home zone area. Since each home zone area is typically much smaller than the associated location area, by paging the mobile station only within the home zone, valuable channel resources are better utilized.

Figure 6:
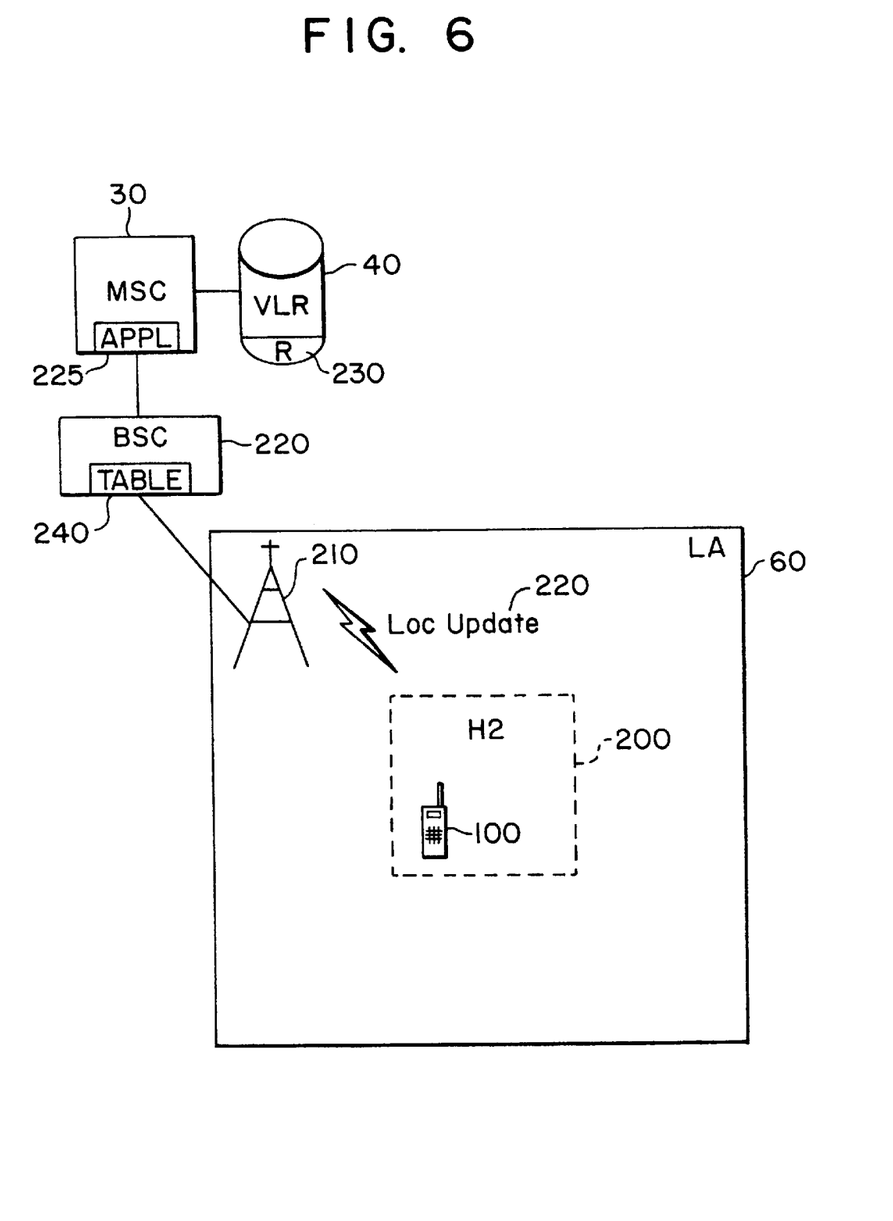
FIG. 6 is a block diagram of a PLMN illustrating a mobile station performing a location update upon entering the designated home zone.

Reference is now made to FIG. 6 illustrating a mobile station 100 performing a location update upon entering a designated home zone 200. Whenever the mobile station 100 enters a particular location area (LA) 60, the mobile station 100 performs a conventional location update with the serving MSC/VLR 30/40. The location update informs the VLR 40 of the mobile station's current location and, thereafter, all paging for incoming calls is performed within the specified location area.

In case the mobile station travels into the designated home zone 200, by retrieving the relevant broadcast message transmitted over the cell broadcast channel, the mobile station 100 determines that the mobile station 100 is currently within the designated home zone. In accordance with the teachings of the present invention, although the mobile station 100 is still within the same location area 60, the mobile station 100 performs yet another location update with the serving MSC/VLR 30/40. The transmitted location update signal 200 further comprises a parameter identifying the mobile subscriber's home zone. Upon receiving the newly transmitted location update signal 220, the encapsulated home zone data are stored at a register (R) 230 associated with the MSC/VLR 30/40. As a result, data indicating that the associated mobile station is currently located within his or her designated home zone have been stored at the serving MSC/VLR 30/40. Similarly, in case the mobile station 100 exits the same home zone 200, yet another location update is performed with the serving MSC/VLR 30/40 to remove the previously stored data at the register (R) 230. As a result, the serving MSC/VLR 30/40 is now able to ascertain that the associated mobile station 100 is no longer within the designated home zone 200.

As an alternative, the mobile station may transmit an application layer message to inform the serving MSC/VLR 30/40 that the mobile station 100 has either entered or exited the designated home zone 200. Such application layer messages may include a conventional Short Message Service (SMS) or Unstructured Supplementary Service Data (USSD) message communicated over a Stand-alone Dedicated Control Channel (SDCCH). Similarly, the transmitted message includes data representing the designated home zone. An application module 225 associated with the serving MSC/VLR 30/40 then receives the transmitted application layer data, extracts the encapsulated home zone data, and stored at the register (R) 230.

Figure 7:
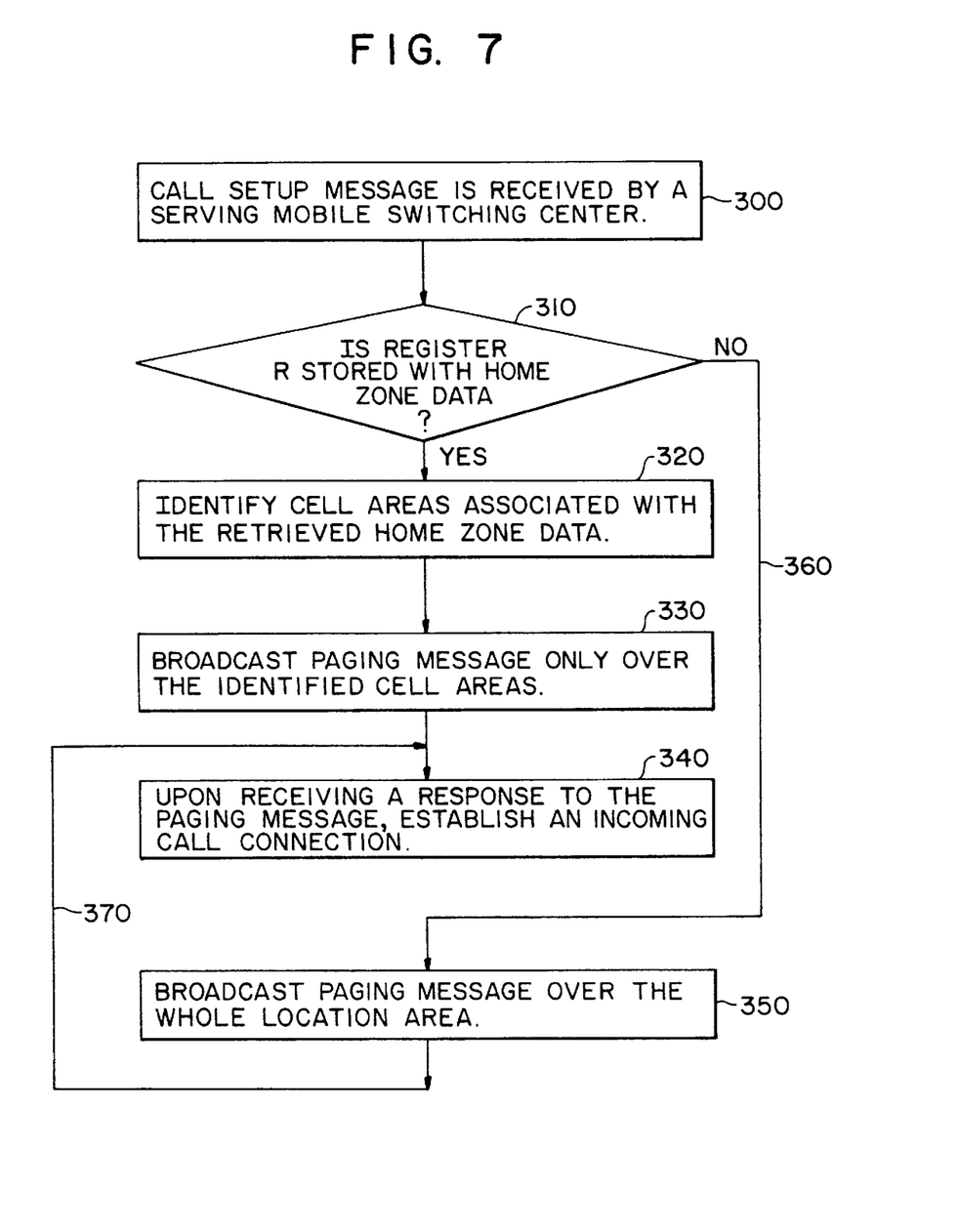
FIG. 7 is a flowchart describing the steps performed by a serving mobile network to route an incoming call towards a mobile station located within its designated home zone.

Reference is now made to FIG. 7 which is a flowchart describing the steps performed by a serving mobile network to route an incoming call towards a mobile station located within its designated home zone. In accordance with a conventional manner as described in FIG. 4, the serving MSC receives an incoming call setup message intended toward a particular called party mobile station at step 300. Such a call setup message includes an Integrated Service Digital Network User Part (ISUP) based Initial Address Message (IAM) transmitted over a connected Signaling System No. 7 (SS7) telecommunications network. By evaluating a Mobile Subscriber Integrated Service Digital Network (MSISDN) number included in the received call setup signal and identifying the called party mobile station, the serving MSC determines whether home zone data are stored at the register (R) associated with the identified called party mobile station at step 310. In case the called party mobile station is not located within the designated home zone and no home zone data have been stored at the register (R), the "no" decision link 360 is taken and paging messages informing the mobile station of an incoming call are broadcast throughout the whole location area in a conventional manner at step 350. In response to receiving an acknowledgment or response back from the paged mobile station, a traffic channel is seized and a call connection is accordingly established with the mobile station at step 340.

On the other hand, referring back to step 310, in case home zone data associated with the called party mobile station are stored at the register (R), the serving MSC is able to ascertain that the called party mobile station is currently located within its designated home zone. In accordance with the teachings of the present invention, instead of paging the mobile station inefficiently and wastefully throughout the whole location area currently covering the mobile station, the mobile station is to be paged only within the cell areas associated with the designated home zone. Accordingly, the cells associated with the specified home zone are identified at step 320. By "mapping" the stored home zone data with appropriate cell identification information, associated cell areas can be identified. Such cell identification information includes Cell Global Identity (CGI), and Cell Identity (CI). The serving MSC or one of the base station controllers (BSCs) connected to the serving MSC can be associated with a table (refer to FIG. 6, the table 240) storing such correlation data and can perform the home zone data to cell area identification mapping function. After identifying the cell areas currently covering the specified home zone, paging messages alerting the mobile station of an incoming call are transmitted selectively throughout the identified cell areas at step 330. By transmitting paging messages throughout the selected few cell areas, valuable logical channel resources for communicating paging messages can be efficiently utilized and managed. After receiving a response from the paged mobile station within the designated home zone, a communication channel, such as a traffic channel (TCH), is seized and a call connection is established at step 340.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for paging a mobile station within a mobile coverage area, said method comprising the steps of:
   designating a location area within said mobile coverage area, said location area being smaller in size than said mobile coverage area;
   designating a home zone area for said mobile station, said home zone area being located within said location area and being smaller in size than said location area;
   storing at least one home zone area identifier in said mobile station;
   causing said mobile station to register with a mobile switching center (MSC) associated with said location area upon entering said location area and upon leaving said location area;
   causing said mobile station to further register with said mobile switching center (MSC) upon entering said home zone area and upon leaving said home zone area, as determined by said mobile station using said home zone area identifier;
   receiving an incoming call setup message at a telecommunications node serving said mobile coverage area;
   if said mobile station is registered with said mobile switching center (MSC) as being located within said location area and is identified as being within said home zone area, then paging said mobile station of an incoming call only within said home zone area;
   if said mobile station is registered with said mobile switching center (MSC) as being located within said location area and is identified as not being within said home zone area, then paging said mobile station within said location area.

2. The method of claim 1 wherein said home zone area further comprises at least one cell area.

3. The method of claim 2 wherein said step of paging said mobile station within said home zone area further comprises the steps of:
   within said mobile switching center (MSC),
   retrieving data identifying said home zone area; and
   identifying said at least one cell area within said home zone area by correlating said data with cell identification data associated with said location area.

4. The method of claim 1 wherein said step of storing said at least one home zone area identifier in said mobile station further comprises storing data identifying said home zone area in a Subscriber Identification Module (SIM) located within said mobile station.

5. The method of claim 1 wherein said step of causing said mobile station to further register with said mobile switching center (MSC) upon entering said home zone area and upon leaving said home zone area, further comprises the steps of:
   receiving a broadcast message transmitted over a broadcast channel, said broadcast message comprising cell area data for a cell area that is currently occupied by said mobile station; and
   comparing said cell area data with said at least one home zone area identifier to determine if said mobile station is currently located within said home zone area.

6. The method of claim 1 wherein said step of causing said mobile station to further register with said mobile switching center (MSC) upon entering said home zone area and upon leaving said home zone area, further comprises transmitting a call setup signal from said mobile station to said mobile switching center (MSC), said call setup signal identifying said home zone and whether said mobile station is currently located within said home zone area.

7. The method of claim 1 wherein said step of causing said mobile station to further register with said mobile switching center (MSC) upon entering said home zone area and upon leaving said home zone area, further comprises transmitting an application layer message from said mobile station to said mobile switching center (MSC), said application layer message identifying said home zone and whether said mobile station is currently located within said home zone area.

8. The method of claim 7 wherein said application layer message is transmitted over a Stand-alone Dedicated Control Channel, and selected from a group of messages comprising a Short Message Service (SMS) and an Unstructured Supplementary Service Data (USSD) message.

9. A telecommunications node for paging a mobile station within a mobile coverage area, comprising:
   means for designating a location area within said mobile coverage area, wherein said location area is smaller in size than said mobile coverage area;
   means for designating a home zone area for said mobile station, wherein said home zone area is located within said location area and smaller in size than said location area;
   means for storing at least one home zone area identifier in said mobile station;
   means for causing said mobile station to register with a mobile switching center (MSC) associated with said location area upon entering said location area and upon leaving said location area;
   means for causing said mobile station to further register with said mobile switching center (MSC) upon entering said home zone area and upon leaving said home zone area;
   means for receiving an incoming call setup message towards said mobile station;
   means for determining whether said mobile station is currently located within said home zone area;
   means for paging said mobile station only within said home zone area when said mobile station is located within said location area and is identified as being within said home zone area; and
   means for paging said mobile station within said location area when said mobile station is located within said location area and is identified as not being within said home zone area.

10. The telecommunications node of claim 9 wherein said home zone area further comprises at least one cell area.

11. The telecommunications node of claim 10 wherein said means for paging said mobile station within said home zone area further comprises:
    means for retrieving data identifying said home zone area; and
    means for identifying said at least one cell area within said home zone area.

12. The telecommunications node of claim 9 wherein said means for determining whether said mobile station is currently located within said home zone area further comprises means for determining whether a location update has been performed by said mobile station within said home zone area.

13. The telecommunications node of claim 9 wherein said means for storing said at least one home zone area identifier in said mobile station further comprises means for storing data identifying said home zone area in a Subscriber Identification Module (SIM) located within said mobile station.

14. The telecommunications node of claim 9 wherein said means for means for causing said mobile station to further register with said mobile switching center (MSC) upon entering said home zone area and upon leaving said home zone area, further comprises:

means for receiving a broadcast message transmitted over a broadcast channel, said broadcast message comprising cell area data for a cell area that is currently occupied by said mobile station; and means for comparing said cell area data with said at least one home zone area identifier to determine if said mobile station is currently located within said home zone area.

15. The telecommunications node of claim 9 wherein said means for causing said mobile station to further register with said mobile switching center (MSC) upon entering said home zone area and upon leaving said home zone area, further comprises:

means for transmitting a call setup signal from said mobile station to said mobile switching center (MSC), said call setup signal identifying said home zone and whether said mobile station is currently located within said home zone area.

16. The telecommunications node of claim 9 wherein said means for causing said mobile station to further register with said mobile switching center (MSC) upon entering said home zone area and upon leaving said home zone area, further comprises:

means for transmitting an application layer message from said mobile station to said mobile switching center (MSC), said application layer message identifying said home zone and whether said mobile station is currently located within said home zone area.

17. The telecommunications node of claim 16 wherein said application layer message is transmitted over a Stand-alone Dedicated Control Channel, and selected from a group of messages comprising a Short Message Service (SMS) and an Unstructured Supplementary Service Data (USSD) message.

* * * * *